July 10, 1945.  W. TYDON ET AL  2,379,999
CONTROL OPERATING MECHANISM
Filed Jan. 31, 1941
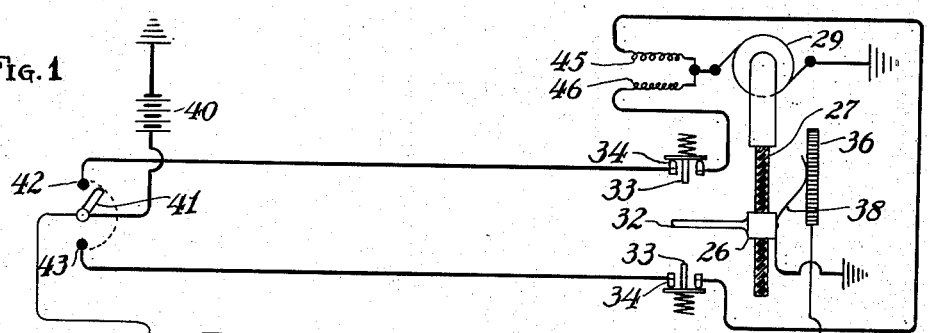
Fig. 1
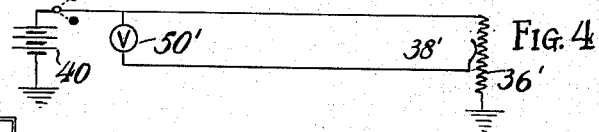
Fig. 4
Fig. 2.
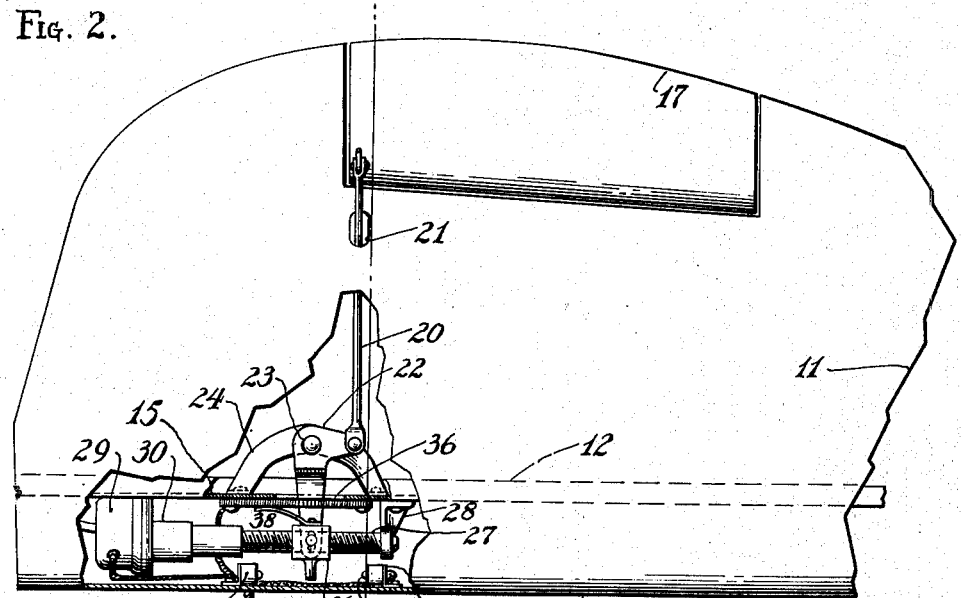
Fig. 3.
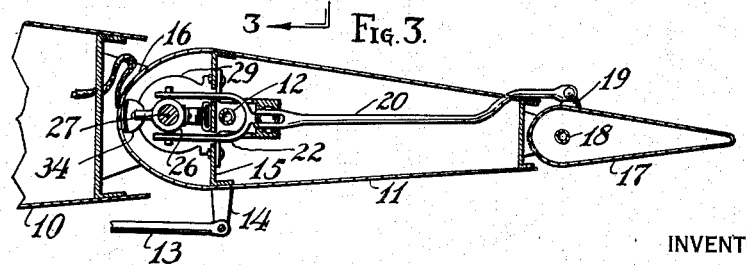
INVENTORS
WALTER TYDON AND
BY WINFIELD J. AUGUSTINE
ATTORNEY Patented July 10, 1945

2,379,999

UNITED STATES PATENT OFFICE 2,379,999

CONTROL OPERATING MECHANISM

Walter Tydon, Kenmore, and Winfield J. Augustine, Hempstead, N. Y., assignors to Curtiss-Wright Corporation, a corporation of Delaware Application January 31, 1941, Serial No. 376,748

4 Claims. (Cl. 244—87)

This invention relates to aircraft and is particularly concerned with improvements in operating mechanism for control surfaces thereof.

In modern aircraft, devices variously known as trim tabs or Flettner balances, are used for the purpose of trimming the aircraft longitudinally or directionally. Such tabs are hinged to the rearward portions of the horizontal control surfaces or stabilizers, or to the vertical control surfaces or rudders, and are usually controllable from the pilot's cockpit by cable connections or some form of mechanical operating means. As the air controls are simplified, it becomes desirable to minimize extended mechanical moving devices, with a possible exception of the main air controls such as the elevators, rudders, or ailerons and it is accordingly an object of this invention to provide remote control means for trim tabs wherein control movement of the trim tab is accomplished by means of an electric motor disposed close to the tab, and whereby the control system for the motor comprises merely a pair of conductors extending from the pilot's quarters toward the control airfoils and tabs.

A further object is to provide means for limiting the angular movement of the trim tabs while an additional object is to provide electrical means for indicating the adjusted position of trim tabs at any time.

A further object consists in disposing the power device and mechanical transmission for adjusting a trim tab in such a position in a movable control airfoil that its weight attains an advantageous function aerodynamically. Still another object is to provide a transmission mechanism, disposed within a movable airfoil, for the purpose of adjusting a trim tab hinged to the movable airfoil.

Further objects will be appreciated in reading the annexed description in connection with the drawing, in which:

Fig. 1 is a wiring diagram for the electrical trim tab control system of the invention;

Fig. 2 is a plan of an aircraft movable control surface, partly broken away, to show the operating mechanism for a trim tab;

Fig. 3 is a section on the line 3—3 of Fig. 2; and

Fig. 4 is a simplified wiring diagram for an alternate mode of indicating the adjusted position of a trim tab.

Referring first to Figs. 2 and 3, we show a support structure 10 which may comprise a fixed stabilizing airfoil at the empennage of the aircraft or alternately, this may comprise one of the main wings. To the trailing edge of the support 10 is hinged a movable control airfoil 11, on an axis 12, and controlled movement of this airfoil is accomplished through a push-pull rod 13 clevised to a horn 14 fixed to the airfoil. The airfoil 11 includes a front spar 15 adjacent to the hinge 12, and the airfoil covering embraces this spar forming a leading edge 16 forward of the hinge 12 and masked by the trailing edge of the support 10. Close to the trailing edge of the airfoil 11, a trim tab 17 is hinged on an axis 18, the tab having a horn 19 hinged to a push-pull rod 20 extending through a port 21 in the airfoil covering to a bell crank 22 hinged at 23 to a bracket 24 secured to the spar 15. The bellcrank 22 extends through an aperture in the spar 15 and is loosely connected to a nut 26 embracing a screw shaft 27 journalled at its right end in a bearing 28 and driven at its left end by a motor 29 through a reduction gear 30. The nut 26 carries an extension 32 engageable with buttons 33 of limit switches 34 secured within the leading edge of the airfoil. As will shortly be described in connection with the wiring diagram, the motor 29 may be energized to traverse the nut 26 along the screw 27 which, through the bellcrank 22, moves the trim tab 17 to one side or the other of the central plane of the airfoil 11. When the tab 17 moves to either extreme position, the nut extension 32 engages one or the other of the limit switch buttons 33 to de-energize the motor 29.

Along the front face of the spar 15 an electrical resistor 36 is secured and the nut 26 carries a sliding contact arm 38 engaging the surface of the resistor.

Now referring to Fig. 1, the heavy wiring indicates the power circuit for the motor 29, this circuit including a power source 40 grounded at one side and connected at its other side to a switch arm 41 selectively engageable with either of two contacts 42 or 43 respectively connected to one or the other of the limit switches 34, these in turn being connected to the forward and reverse field windings 45 and 46 provided in the electric motor 29, these windings being serially connected with the motor armature whose opposite terminal is grounded. If an operator desires to move the trim tab 17 to one side or the other, he closes the switch arm 41 on the point 42 or the point 43, which will energize the motor 29 for forward or reverse rotation with resultant move of the trim tab. When the trim tab reaches a limiting position, the nut extension 26 will contact the limit switch button 33 to open the motor energizing circuit previously closed; closure of the motor circuit for the other direction of rotation will cause reverse rotation of the motor since the limit switch 34 for the other direction of rotation is closed.

For indicating the position of the trim tab, an ammeter 50 is installed in the cockpit, this being serially connected with the power source, the resistor 36, the sliding contact 38, and ground. As the nut 26 moves along the screw shaft 27, the resistance of the resistor 36 will be changed proportionally so that the ammeter 50 may be directly calibrated to indicate degrees of trim tab displacement from either side of neutral.

Fig. 4 shows an alternate arrangement wherein the ammeter 50 is replaced with a voltmeter 50' whose terminals are connected with one end of the resistor, or potentiometer, in this case, 36' and to the slider 38'. The two ends of the potentiometer resistance 36' are connected across the battery. Thus, the voltmeter will register a voltage drop across the potentiometer which is proportional to the position of the trim tab and the voltmeter, like the ammeter 50, may be calibrated in degrees of trim tab displacement from neutral.

Returning again to Fig. 3, it will be noted that the motor 29 and screw shaft 27, along with the bulk of the power mechanism for adjusting the trim tab, is disposed ahead of the airfoil hinge axis 12 and lies wholly within the confines of the airfoil. The mechanism thus assists in statically balancing the airfoil 11 about its hinge axis to the end that fluttering tendency in the airfoil is suppressed. The teaching of statically balancing, or over-balancing, an airfoil is old in the art but in this instance the balancing may be accomplished by useful mechanism in the airfoil leading edge rather than by the use of dead weight.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In aircraft controls, in combination, a fixed airfoil, a manually controllable airfoil hinged to the trailing edge thereof about a normally horizontal axis rearwardly spaced from but relatively close to the leading edge of the controllable airfoil, a trim tab hinged to the rear edge of the controllable airfoil, an electric motor in the leading edge of the controllable airfoil ahead of said hinge axis so that the motor assists in statically balancing the controllable airfoil, a mechanical transmission connecting the motor and trim tab to translate motor operation into tab movement with respect to the controllable airfoil, and a selectively operable electric circuit for energizing said motor.

2. In an aircraft, a manually controllable airfoil hinged to a support about a normally horizontal axis disposed relatively close to but rearwardly spaced from the leading edge of said airfoil, a trim tab hinged to the rear edge of the controllable airfoil, an electric motor in the leading edge of the controllable airfoil having a screw shaft rotated thereby, a non-rotating nut movable along the screw shaft upon rotation thereof, means connecting the nut to the trim tab for operation of the trim tab thereby relative to said controllable airfoil, said electric motor, screw shaft and nut all being located in the controllable airfoil ahead of said hinge axis so that these elements assist in statically balancing the controllable airfoil.

3. In an aircraft, a support, an adjustable airfoil hinged thereto about a normally horizontal axis disposed relatively close to but rearwardly spaced from the leading edge of said airfoil, an auxiliary airfoil hinged to the trailing edge of said adjustable airfoil, a motor in the leading edge of said adjustable airfoil ahead of its hinge axis whereby the motor assists in statically balancing the adjustable airfoil, and means operatively connecting said motor to the auxiliary airfoil for operation of said auxiliary airfoil with respect to the adjustable airfoil.

4. In an aircraft, a support, an adjustable airfoil hinged thereto about a normally horizontal axis disposed relatvely close to but spaced from the edge of said airfoil adjacent said support, an auxiliary airfoil hinged to the edge of said adjustable airfoil remote from said support, a motor disposed within said adjustable airfoil between said first mentioned edge of said airfoil and said axis whereby said motor assists in statically balancing said adjustable airfoil, and means opertively connecting said motor to said auxiliary airfoil for operation of said auxiliary airfoil with respect to said adjustable airfoil.

WALTER TYDON.
WINFIELD J. AUGUSTINE.